United States Patent
Yang et al.

(10) Patent No.: US 10,420,080 B2
(45) Date of Patent: Sep. 17, 2019

(54) TRANSMISSION PREEMPTION AND ITS INDICATION

(71) Applicant: MEDIATEK INC., Hsinchu (TW)

(72) Inventors: Weidong Yang, San Diego, CA (US); Yih-Shen Chen, Hsinchu County (TW); Chien-Chang Li, Penghu County (TW); Bo-Si Chen, Keelung (TW)

(73) Assignee: HFI Innovation INC., HsinChu (TW)

( * ) Notice: Subject to any disclaimer, the term of this patent is extended or adjusted under 35 U.S.C. 154(b) by 0 days.

(21) Appl. No.: 15/473,628

(22) Filed: Mar. 30, 2017

(65) Prior Publication Data

US 2017/0290004 A1 Oct. 5, 2017

Related U.S. Application Data

(60) Provisional application No. 62/317,447, filed on Apr. 1, 2016.

(51) Int. Cl.
*H04J 3/00* (2006.01)
*H04W 72/04* (2009.01)
(Continued)

(52) U.S. Cl.
CPC ....... *H04W 72/0406* (2013.01); *H04L 5/0037* (2013.01); *H04L 5/0044* (2013.01);
(Continued)

(58) Field of Classification Search
CPC ............................................. H04W 72/0046
See application file for complete search history.

(56) References Cited

U.S. PATENT DOCUMENTS

2005/0249120 A1 11/2005 Heo et al. ............ 370/236
2012/0106386 A1* 5/2012 Johansson ............ H04W 24/08
370/252
(Continued)

FOREIGN PATENT DOCUMENTS

CN 101141178 A 3/2008
CN 102932874 A 2/2013
(Continued)

OTHER PUBLICATIONS

International Search Report and Written Opinion of International Search Authority for PCT/CN2017/079018 dated Jun. 13, 2017 (11 pages).
(Continued)

*Primary Examiner* — Gerald A Smarth
(74) *Attorney, Agent, or Firm* — Imperium Patent Works; Helen Mao

(57) ABSTRACT

Methods and apparatus are provided for transmission preemption and its indication. In one novel aspect, the UE receives a downlink resource assignment and determines whether an ultra-low latency (ULL) alert signal exists, wherein the ULL alert signal indicates a set of soft bits are overridden. The UE discards the set of soft bits from the overridden resources upon determining the ULL alert signal exists. In one embodiment, the ULL alert signal resides in the assignment subframe, and the overridden soft bits are in the assignment subframe. The alert timing for the ULL alert signal is preconfigured. In another embodiment, the ULL alert signal resides in a subframe that is right after the assignment subframe. The alert signal is enabled through an enabling of an enhanced mobile broadband and ULL service. The alter signal indicates a superset of the overridden soft bits or part of the overridden soft bits.

15 Claims, 13 Drawing Sheets

(51) Int. Cl.

| | |
|---|---|
| *H04W 52/14* | (2009.01) |
| *H04W 72/10* | (2009.01) |
| *H04W 72/08* | (2009.01) |
| *H04L 5/00* | (2006.01) |
| *H04W 84/04* | (2009.01) |
| *H04W 52/16* | (2009.01) |
| *H04W 52/28* | (2009.01) |

(52) U.S. Cl.
CPC .......... *H04L 5/0087* (2013.01); *H04L 5/0092* (2013.01); *H04W 52/146* (2013.01); *H04W 72/042* (2013.01); *H04W 72/0446* (2013.01); *H04W 72/085* (2013.01); *H04W 72/10* (2013.01); *H04L 5/0007* (2013.01); *H04W 52/16* (2013.01); *H04W 52/281* (2013.01); *H04W 84/042* (2013.01)

(56) References Cited

U.S. PATENT DOCUMENTS

| | | | | |
|---|---|---|---|---|
| 2013/0176981 | A1* | 7/2013 | Earnshaw | H04L 1/02 370/329 |
| 2014/0080483 | A1* | 3/2014 | Elsherif | H04W 36/22 455/436 |
| 2015/0333898 | A1 | 11/2015 | Ji et al. | 370/280 |
| 2015/0334686 | A1 | 11/2015 | Ji et al. | 370/280 |
| 2015/0334729 | A1 | 11/2015 | Ji et al. | 370/336 |
| 2016/0020891 | A1 | 1/2016 | Jung et al. | 370/280 |
| 2016/0088604 | A1* | 3/2016 | Patel | H04L 5/0053 370/336 |
| 2016/0088652 | A1 | 3/2016 | Patel et al. | 370/329 |
| 2016/0095104 | A1 | 3/2016 | Chen et al. | 370/329 |
| 2016/0128096 | A1* | 5/2016 | Damnjanovic | H04L 5/0055 370/329 |
| 2016/0285935 | A1* | 9/2016 | Wu | H04W 4/90 |
| 2016/0295584 | A1* | 10/2016 | Chen | H04W 72/0446 |
| 2016/0352481 | A1 | 12/2016 | Jiang et al. | 370/329 |
| 2016/0380751 | A1* | 12/2016 | Lindoff | H04W 56/00 370/336 |
| 2017/0111923 | A1 | 4/2017 | Nogami et al. | 370/329 |
| 2017/0135084 | A1* | 5/2017 | Kuchibhotla | H04W 72/044 |
| 2017/0230994 | A1 | 8/2017 | You et al. | |
| 2017/0265166 | A1 | 9/2017 | Hosseini et al. | |
| 2017/0289985 | A1* | 10/2017 | Yang | H04W 52/146 |
| 2017/0325164 | A1 | 11/2017 | Lee et al. | |
| 2018/0212732 | A1 | 7/2018 | You et al. | |
| 2018/0234998 | A1 | 8/2018 | You et al. | |
| 2018/0310282 | A1 | 10/2018 | Shi et al. | |

FOREIGN PATENT DOCUMENTS

| | | |
|---|---|---|
| CN | 1033796628 A | 10/2013 |
| CN | WO2013185833 A1 | 12/2013 |
| EP | 1594246 A2 | 11/2005 |
| EP | 2144379 A1 | 1/2010 |
| EP | 2670187 A1 | 12/2013 |
| WO | WO2015179144 A1 | 11/2015 |
| WO | WO2016040290 A1 | 3/2016 |

OTHER PUBLICATIONS

International Search Report and Written Opinion of International Search Authority for PCT/CN2017/079019 dated Jun. 26, 2017 (12 pages).

International Search Report and Written Opinion of International Search Authority for PCT/CN2017/079064 dated Jun. 7, 2017 (11 pages).

USPTO, the office action for the related U.S. Appl. No. 15/473,622 dated Dec. 11, 2018 (8 pages).

USPTO, the office action for the related U.S. Appl. No. 15/473,619 dated Sep. 17, 2018 (16 pages).

USPTO, office action for the related U.S. Appl. No. 15/473,619 dated Apr. 30, 2019 (17 pages).

EPO, search report for the EP patent application 17773318.5 dated May 15, 2019 (7 pages).

R1-160983 3GPP TSG RAN WG1 Meeting #84, ZTE, "Downlink control channels for short TTI", St. Julian's, Malta, Feb. 15-19, 2016 (5 pages) *figure 1* *sections 2-4*.

R1-160292 3GPP TSG RAN WG1 Meeting #84, Huawei et al., "Short TTI for DL transmissions", St Julian's, Malta, Feb. 15-19, 2016 (7 pages) *figures 1-3* *section 3*.

EPO, search report for the EP patent application 17773307.8 dated May 15, 2019 (8 pages).

R1-156819 3GPP TSG RAN WG1 Meeting #83, Samsung, "Study on specification impact for downlink due to TTI shortening", Anaheim, USA, dated Nov. 15-22, 2015. *pp. 1-4*, *figures 103*.

EPO, search report for the EP patent application 17773306.0 dated May 15, 2019 (13 pages).

R1-160862 3GPP TSG RAN WG1 Meeting #84, Intel Corp., "On multiplexing of PDSCH with different TTIs and related enhancements", St Julian's, Malta, dated Feb. 15-19, 2016. *pp. 1/3-pp. 2/3; figure 1(b)*.

\* cited by examiner

TRANSMISSION PREEMPTION AND ITS INDICATION

CROSS REFERENCE TO RELATED APPLICATIONS

This application claims priority under 35 U.S.C. § 119 U.S. provisional application 62/317,447 entitled "SYSTEM DESIGN FOR LOW LATENCY COMMUNICATION AND ULTRA-LOW LATENCY COMMUNICATIONS" filed on Apr. 1, 2016, the subject matter of which is incorporated herein by reference.

TECHNICAL FIELD

The disclosed embodiments relate generally to wireless communication, and, more particularly, to methods and apparatus for wireless communication system design.

BACKGROUND

Mobile networks communication continues to grow rapidly. The mobile data usage will continue skyrocketing. New data applications and services will require higher speed and more efficient. Large data bandwidth application continues to attract more consumers. Today, 3G/4G mobile wireless systems provide connectivity for wide range of applications and services. In the next generation 5G network, it is expected that the latency issue will be one of the key performance indicators (KPIs), which shape the air interface and network architecture design.

Short TTIs (Transmission Time Interval) are effective in reducing end-to-end latency and ultimately improves user experiences. In the long term evolve (LTE) system, typically eNB uses downlink control channel to inform UE of the downlink data transmission. One to three OFDM symbols in a subframe with fourteen OFDM symbols are set aside for control signaling, including PDCCH, PHICH, and PCFICH. Even if there is very little control signaling actually sent in a subframe, the whole control region is still reserved and the spare resource not taken by downlink control still cannot be used by downlink data, except that PCFICH can be used to control the size of the control region. On a short TTI, such a practice can lead to a severe waste of radio resources. Further, the data packets for one UE can be of different sizes and can have different latency requirements, which are best addressed with TTIs with different lengths. For a UE, if the network can support only one TTI length at any given time, then eNB cannot address the different requirements satisfactorily.

Improvements and enhancements are required to improve system latency. In particular, enabling resource sharing between downlink control and downlink data and simultaneous supports for TTIs of different lengths are desired.

SUMMARY

Apparatus and methods are provided for low latency an ultra-low latency (ULL) communications. In novel aspect, short TTIs are configured for low latency communications. The UE configures one or more downlink short transmission time interval (sTTI) regions over a normal TTI region in a system bandwidth. The UE decodes one or more low latency control channels and one or more normal latency control channels, wherein each low latency control channel indicates one or more sTTI regions for one or more UEs in the wireless network. The UE obtains one or more sTTI regions for the UE based on the decoded one or more low latency control channels and the one or more normal latency channels. In one embodiment, the location short TTI control channels is determined by detecting a short TTI control message at a beginning of a TTI and obtaining a duration of the short TTI in the detected short TTI control message. In another embodiment, the one or more short TTI regions are configured by a short TTI configuration comprising: configuration through a SIB message, configuration through a dedicated RRC configuration, configuration through a dynamic signaling, and a static configuration. In yet another embodiment, the short TTI regions are activated when receiving an activation signal via normal latency control command.

In one embodiment, the UE obtains one or more uplink resources based on corresponding downlink short TTI transmissions, wherein the one or more uplink resources are mapped to corresponding downlink short TTI transmissions according to a mapping rule. In another embodiment, a short PDSCH (sPDSCH) is demodulated based on CRS, and wherein Pa/Pb for downlink power control is configured with different value than a regular PDSCH. In yet another embodiment, a CSI feedback for a short PDSCH (sPDSCH) is configured differently from a regular PDSCH.

In another novel aspect, the UE is configured for control overhead reduction. The UE configures one or more short transmission time interval (sTTI) regions over a normal TTI region in a system bandwidth. The sTTI regions are shared by the UE and one or more other, each UE includes a self-contained control information sPDSCH occupying a control information region. The UE detects a cover signal, which indicates one or more resource elements (REs) in the sPDSCH control information region that can be used for data transmission. The UE obtains data transmission from the REs in the SPDCCH control information region based on the detected cover signal. In one embodiment, the cover signal is a dedicated signal such that the SPDCCH control information for the UE includes resources by one or more SPDCCH for the one or more other UEs in the wireless network. In another embodiment, the cover signal is a common signal, and wherein the common signal comprises information of radio resource usage for all sPDCCHs. In yet another embodiment, the cover signal is encoded in a downlink control information (DCI) intended for the UE, and wherein the cover signal indicates control channel elements (CCEs) of PDCCHs taken by other UEs in the wireless network. In one embodiment, the cover signal indicates one or more CCE REs to be excluded for data transmission.

In yet another novel aspect, ULL is configured for the UE. The UE receives a downlink resource assignment and determines whether an ultra-low latency (ULL) alert signal exists, wherein the ULL alert signal indicates a set of soft bits are overridden. The UE discards the set of soft bits from the overridden resources upon determining the ULL alert signal exists. The UE performs channel decoding based of the received downlink resource. In one embodiment, the ULL alert signal resides in the assignment subframe, and the overridden soft bits are in the assignment subframe. The alert timing for the ULL alert signal is preconfigured. In another embodiment, the ULL alert signal resides in a subframe that is right after the assignment subframe, and wherein the overridden soft bits are in the assignment subframe. The alert signal is enabled through an enabling of an enhanced mobile broadband (eMBB) and ULL service. In one embodiment, the alter signal indicates a superset of the overridden soft bits. In another embodiment, the alter signal indicates part of the overridden soft bits.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
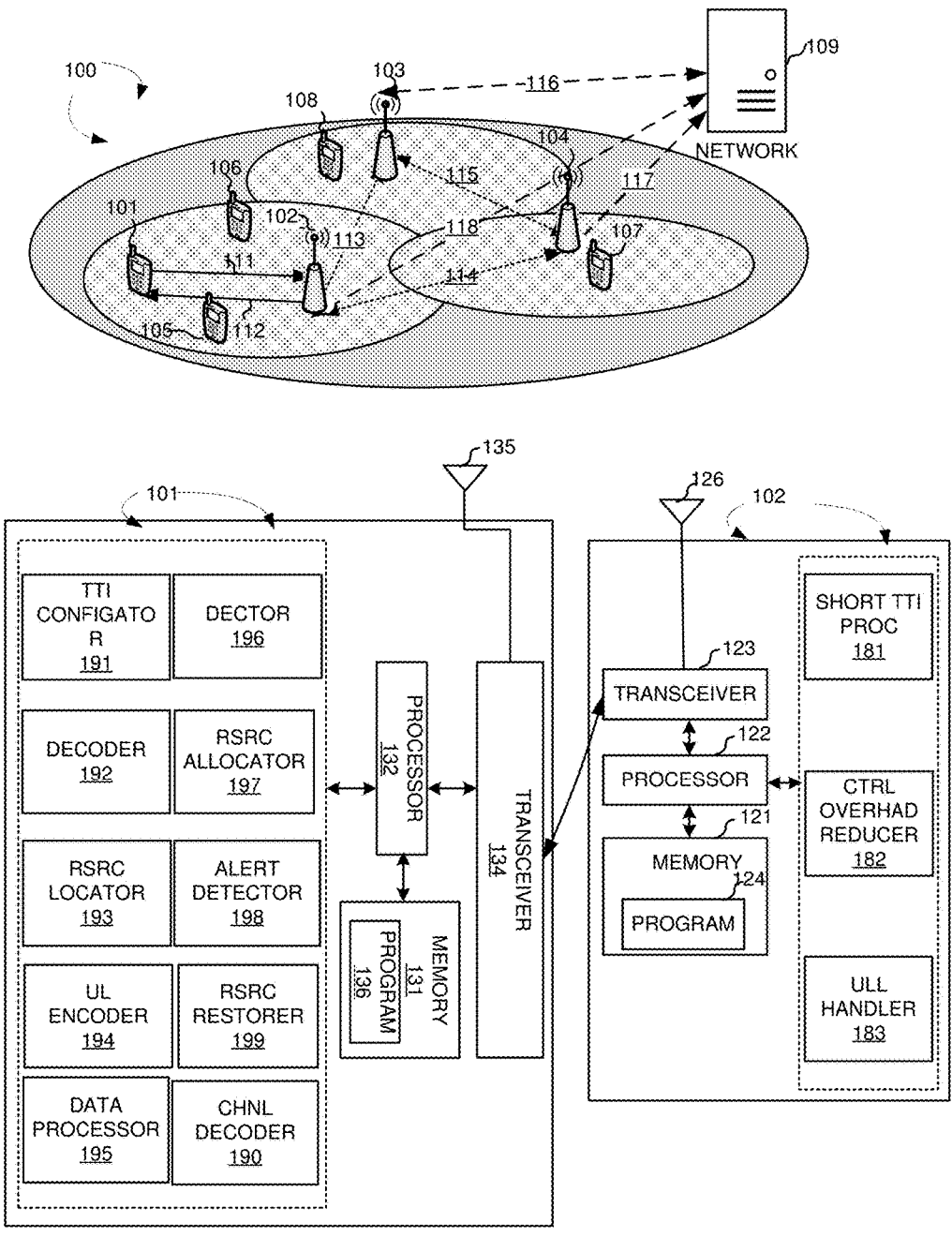
FIG. 1 illustrates a system diagram of a wireless network that supports low latency and ultra-low latency communications in accordance with embodiments of the current invention.

FIG. 1 illustrates a system diagram of a wireless network that supports low latency and ultra-low latency communications in accordance with embodiments of the current invention. Wireless communication system 100 includes one or more wireless networks each of the wireless communication network has a fixed base infrastructure units, such as receiving wireless communications devices or user equipment (UE) 102 103, and 104, forming wireless networks distributed over a geographical region. The base unit may also be referred to as an access point, an access terminal, a base station, a Node-B, an eNode-B, or by other terminology used in the art. Each of the receiving UE 102, 103, and 104 serves a geographic area. Backhaul connections 113, 114 and 115 connect the non-co-located receiving UEs, such as 102, 103, and 104. These backhaul connections can be either ideal or non-ideal A wireless communications device 101 in wireless network 100 is served by base station 102 via uplink 111 and downlink 112. Other UEs 105, 106, 107, and 108 are served by different base stations. UEs 105 and 106 are served by base station 102. UE 107 is served by base station 104. UE 108 is served by base station 103.

In one novel aspect, wireless communication network 100 supports low latency and ultra-low latency communication using short TTIs. In one embodiment, the UE configures one or more downlink short transmission time interval (sTTI) regions over a normal TTI region in a system bandwidth. The short TTIs have shorter TTI length than a normal TTI. The UE then decodes the one or more low latency control channels and one or more normal latency control channels, which indicates one or more sTTI regions for one or more UEs in the wireless network. The UE obtains one or more sTTI regions for the UE based on the decoded one or more low latency control channels and the one or more normal latency channels.

In another novel aspect, wireless communication network 100 supports control and data multiplexing. In one embodiment the UE transmitting data in the unused control subframes. In one embodiment, the UE configures one or more short TTI regions over a normal TTI region in a system bandwidth. The UE detects a cover signal, which indicates one or more resource elements (REs) in the sPDCCH control information region that can be used for data transmission. The UE subsequently, obtains data transmission from the REs in the SPDCCH control information region based on the detected cover signal.

In yet another novel aspect, wireless communication network 100 supports ultra-low latency communications. In one embodiment, the UE receives a downlink resource assignment and determines whether an ultra-low latency (ULL) alert signal exists. The ULL alert signal indicates a set of soft bits are overridden. The UE discards the set of soft bits from the overridden resources upon determining the ULL alert signal exists and performs channel decoding subsequently. In one embodiment, the alert signal is in the same TTI as the assignment TTI. In another embodiment, the alert signal is in the next subframe of the assignment TTI.

FIG. 1 further shows simplified block diagrams of wireless stations 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as a short TTI processor 181 that configures short TTIs for UEs, a control overhead reducer 182 that reuses control subframes for data transmission, a ULL handler 183 that sends alert signals to UEs for ULL soft bits.

UE 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

UE 101 also includes a set of control modules that carry out functional tasks. A TTI configurator 191 configures one or more downlink short TTI (sTTI) regions over a normal TTI region in a system bandwidth in a wireless network, wherein the resources in the sTTI regions have short TTI length. A decoder 192 decodes one or more low latency control channels and one or more normal latency control channels, wherein each low latency control channel indicates one or more sTTI regions for one or more UEs in the wireless network. A resource locator 193 obtains one or more sTTI regions for the UE based on the decoded one or more low latency control channels and the one or more normal latency channels. A UL encoder 194 obtains one or more uplink resources based on corresponding downlink short TTI transmissions, wherein the one or more uplink resources are mapped to corresponding downlink short TTI transmissions according to a mapping rule. A data processor 195 obtains data transmission from the REs in the SPDCCH control information region based on the detected cover signal. A detector 196 detects a cover signal, wherein the cover signal indicates one or more resource elements (REs) in the sPDCCH control information region that can be used for data transmission. A resource allocator 197 receives a downlink resource assignment at an assignment subframe in the wireless network. An alert detector 198 determines whether an ultra-low latency (ULL) alert signal exists, wherein the ULL alert signal indicates a set of soft bits are overridden. A resource locator 199 discards the set of soft bits from the overridden resources upon determining the ULL alert signal exists. A channel decoder 190 performs channel decoding based of the received downlink resource.

Figure 2:
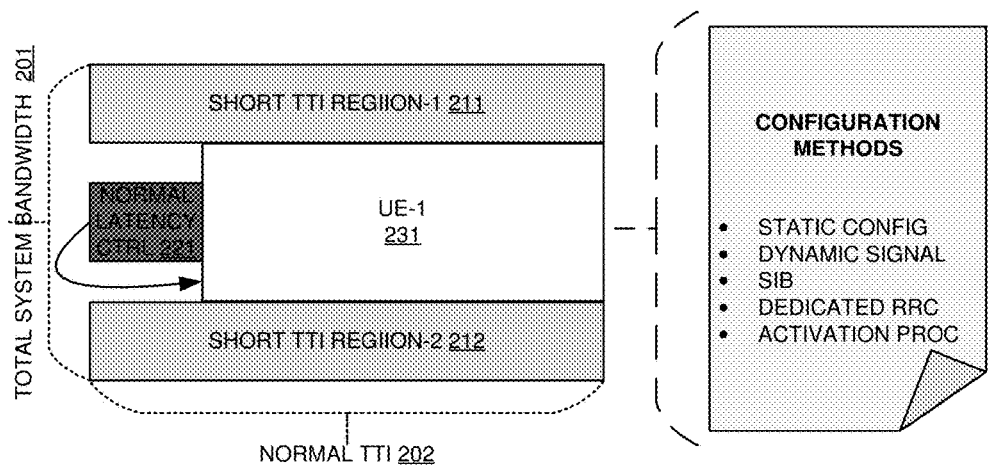
FIG. 2 shows an exemplary diagram of a soft resource partition including short TTIs in accordance with embodiments of the current invention.

FIG. 2 shows an exemplary diagram of a soft resource partition including short TTIs in accordance with embodiments of the current invention. In one novel aspect, over the system bandwidth, one or more regions over a normal TTI can be configured for short TTI transmissions. The time and frequency regions configured for the short TTI transmission are short TTI regions. The illustrated time frequency regions are contiguous in the logical domain. The physical resources are mapped to the logical domain following predefined rule. The illustrated resources are virtual resources and are not necessarily contiguous in the physical domain. A system resource 201 with a normal TTI 202 are configured with both normal TTI region and two short TTI regions, short TTI region-1 211, and short TTI region-2 212. A downlink control 221 points to the time/frequency resource 231 between two short TTI regions, and that resource is given to UE-1. It is also possible for a single transmission; a downlink control schedules resources from parts in the time/frequency resource in the middle, and in one short TTI region or in two short TTI regions.

In one embodiment, the UE simultaneously monitors PDCCH and sPDCCH to support dynamical multiplexing of sTTI(s) and TTI in one subframe. An eNB can dynamically switch the TTI type for transmission(s) intended for a UE depending on whether data transmission is during the slow start stage or congestion avoidance stage, and only one TTI type is exploited at any given time. In one embodiment, parallel transmissions on different TTI types are enabled. One example is when multiple TCP connections are open between one TCP server or multiple TCP servers and TCP client or TCP clients associated with the UE. One TCP connection may be in the slow start stage, while another TCP connection may be in the congestion avoidance stage, which makes it more difficult for the eNB to settle down on one TTI type to server the UE. Another use case for simultaneous use of different TTI types is applications with different latency requirements can run at the same UE. The UE are assigned different TTIs for different applications.

In one embodiment, the configuration of a short TTI region can static, semi-static, or dynamic, such as through a SIB message, through a dedicated RRC configuration, or through dynamic signaling. The configuration can be at various radio interface time scales such as at a subframe or at a radio frame. The semi-static or dynamic configuration can be further improved by accompanying activation mechanism so that the overlapping resource can be normal TTI or shorter TTI while needed. In another embodiment of activation mechanism is to transmit activation signal via normal latency control command through control region 221.

In one embodiment, the configuration of candidate locations for a short TTI region or a number of short TTI regions can be different for different UEs. For example depending on their processing capabilities, a less capable UE is configured with a fewer number of candidate locations. The UE can be configured to handle less time-stringent TTI types based on the UE capacity. The configuration can also indicate the allowed mixture of TTI types. In another embodiment, the UE is signaled a set of positions in a subframe. At each of those positions, the UE searches for a control channel indicating the start of a TTI. In yet another embodiment, the UE is also signaled a set of PRBs over which it searches for the control channels. In LTE, a PDCCH's REG can come from any of the PRBs in the system bandwidth. For example, a REG of a sPDCCH may come from one of the PRBs in the signaled set only. The sEPDCCH can be defined similarly by restricting its duration over the sTTI and span in the frequency domain to the signed PRB set. As an example, symbols {0, 1, 4, 7, 8, 11} is the set of positions, and PRBs {1, 3, 5, 7, 9, 11, ... , 25} are the PRBs for a UE to search for control channels. In general, a normal TTI can start at symbol zero only. A sTTI with seven symbols can start at symbol zero or symbol seven only. In one embodiment, a sTTI with four symbols can start at symbol zero or symbol four only. A sTTI with three symbols can start at symbols 1, 4, 8, 11 only.

Figure 3:
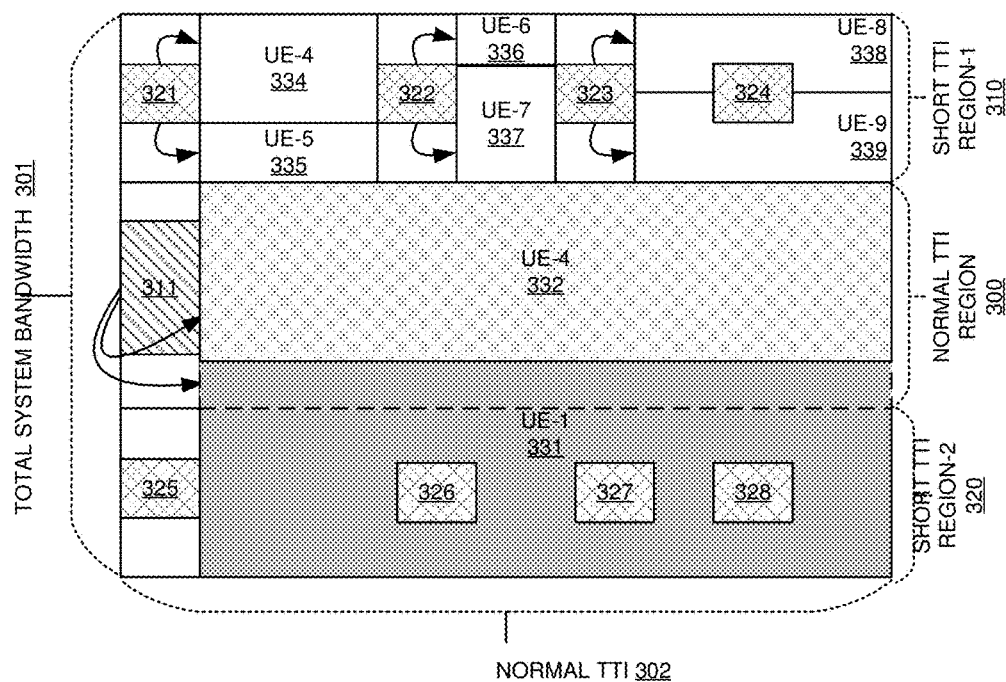
FIG. 3 shows an exemplary diagram of candidate locations for control channels of short TTI and normal TTI in accordance with embodiments of the current invention.

FIG. 3 shows an exemplary diagram of the candidate locations for control channels of short TTI and normal TTI in accordance with embodiments of the current invention. A total system bandwidth 301 with a normal TTI 302 is configured to detect downlink control information at a number of candidate locations: one or more candidate locations for normal latency control which can schedule downlink data transmission in the whole system bandwidth including short TTI regions over a regular TTI, a number of candidate locations for short TTI control which can schedule downlink data transmission in a short TTI region. A normal TTI control channel 311 configures normal TTI regions 331 and 332. Region 331, which includes part of the normal TTI region 330 is assigned to UE-1. Region 332, which includes part of normal TTI region 330 and all the short TTI region-2 320 is assigned to UE-4. A short TTI region-1 310 is controlled by short TTI control channels 321, 322, 323, and 324. Control channel 321 assigns short TTI region 334 to UE-4, and 335 to UE-5. Control channel 322 assigns short TTI region 336 to UE-6, and 337 to UE-7. Control channel 323 assigns short TTI region 338 to UE-8, and 339 to UE-9.

In one embodiment, one or more of the TTI control channels are not being used and can be used for data transmission. As an example, region 338 and region 339 extends to the very end of short TTI region-1. Control channel 324 is not used. eNB does not transmit any downlink control messages on control channel 324. The resources 324, which would be used by downlink control messages for part of the short TTI region-1 can be used for data transmission. Different types of short TTIs can be supported as shown in FIG. 3.

In another embodiment, one UE can receive different type of TTI assignment. UE-4 receives two assignments: one for a sTTI and another for a regular TTI. The assignment for the sTTI can be used for a TCP connection in the slow start stage; and the assignment for the regular TTI can be used for another TCP connection, which is in the congestion avoidance stage. In one embodiment, the locations for short TTI controls are preconfigured. In another embodiment, the locations for short TTI controls are determined dynamically. UE 4 detects short TTI control message(s) at the beginning of a TTI in the short TTI region-1 310. The duration of the short TTI is provided in the detected downlink control message(s). Then the UE attempts to detect short TTI control messages(s) after the end of the short TTI.

Figure 4:
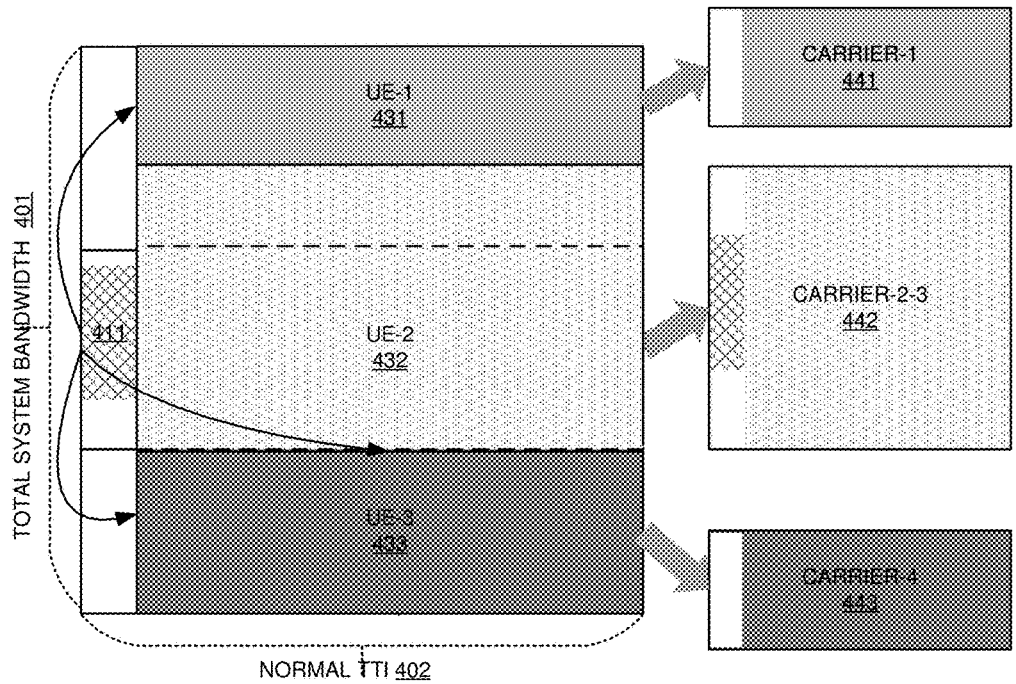
FIG. 4 shows an exemplary diagram for the mapping from logical resource to physical resources in accordance with embodiments of the current invention.

FIG. 4 shows an exemplary diagram for the mapping from logical resource to physical resources in accordance with embodiments of the current invention. One goal for the soft partition of system resource is to utilize the fragmented spectrum under one operator's control, or patch together fragmented spectrum from two or more operators when they enter a spectrum sharing agreement. The mapping of physical resources to logical resources is utilized. Four carriers, carrier-1, carrier-2, carrier-3, and carrier-4 are configured. A total system resource 401 with a normal TTI 402 is configured for three UEs, UE-1, UE-2, and UE-3. TTI control channel 441 configures three regions for each of the UE. UE-1 is configured with region 431. UE-2 is configured with region 432. UE-3 is configured with region 433. The configured logical regions are mapped to different carrier. As shown, UE-1 is mapped to carrier-1 441. UE-2 is mapped to carrier-2-3 442. UE-3 is mapped to carrier-4 443.

Figure 5:
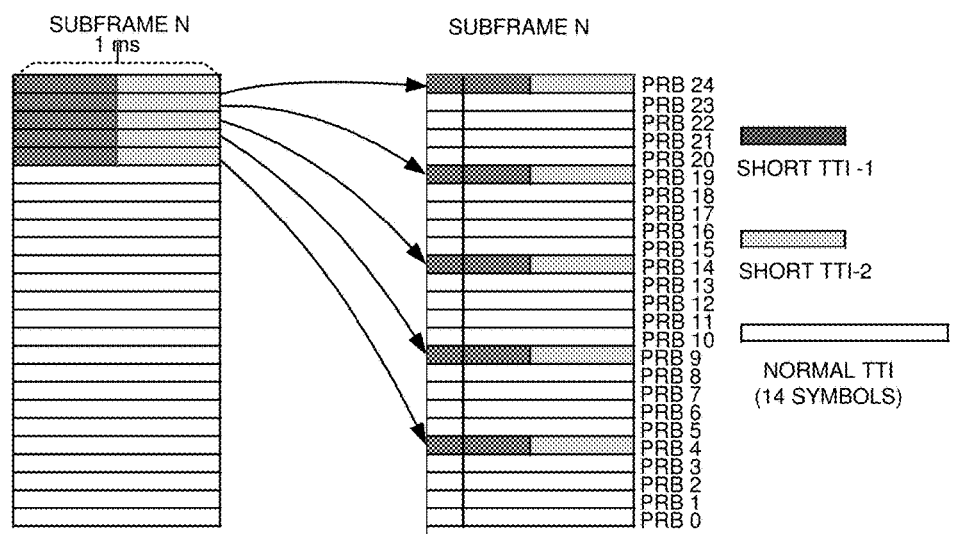
FIG. 5 shows exemplary diagrams for mapping of logical control resources to physical resource in accordance with embodiments of the current invention.

FIG. 5 shows exemplary diagrams for mapping of logical control resources to physical resource in accordance with embodiments of the current invention. One goal is to harvest frequency diversity gain by mapping a short TTI region over well-separated frequencies. For both DL and UL, in 1 ms, short TTIs can be multiplexed with DL/UL normal TTIs in an interleaved fashion in the frequency domain. Resources can be partitioned among short TTIs (TTI at 1/3/4/7 OFDM symbol) and a normal TTI (14 OFDM symbols)). A logical-to-physical mapping can be applied to determine the PRBs taken by short TTIs. Two types of short TTI, short TTI-1, and short TTI-2 are multiplexed with normal TTI1. The five pairs of short TTIs are separated in the frequency domain by taking the PRB24, PRB19, PRB14, PRB9, and PRB4.

Based on the short TTI transmission in the downlink, the uplink resource for data and/or control transmission can be defined or mapped to the corresponding short TTI transmission. The relationship between the corresponding DL and UL transmission can be static, semi-static, or dynamic. In one embodiment, the static mapping is used. DL resource is received at time T1, uplink resource is expected to be available at T2, wherein T2=T1+Tproc_short and Tproc_short is the pre-defined processing time for a specific short TTI subframe duration. In another embodiment, dynamic mapping is used. No uplink resource is set aside specifically for a certain type of downlink short TTI transmissions. The uplink resource for data and/or control is created on-demand according to the current downlink usage of a regular TTI or various short TTIs.

Figure 6:
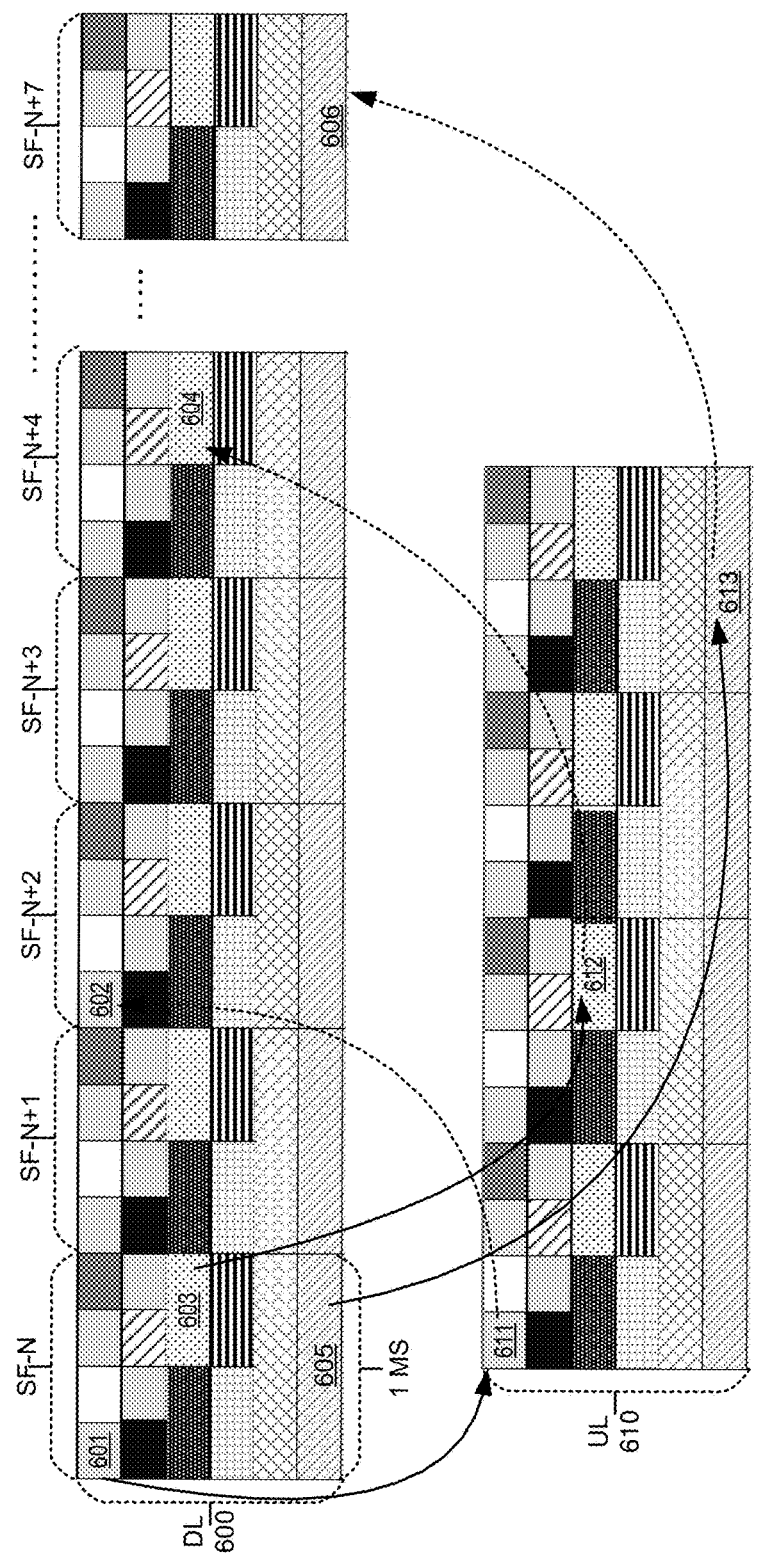
FIG. 6 shows exemplary diagrams for the mapping of downlink and uplink resources with short TTIs configured in accordance with embodiments of the current invention.

FIG. 6 shows exemplary diagrams for the mapping of downlink and uplink resources with short TTIs configured in accordance with embodiments of the current invention. Two types of sTTIs are used in the downlink, and two corresponding types of sTTIs are derived and used in the uplink. Using the derivation or mapping rule from a downlink resource to an uplink resource, just as in the downlink case, no hard partition of resources between regular TTIs, short TTIs, and different levels of short TTIs, such as spanning one half of a regular TTI or a quarter of regular TTI, is necessary. Resources for uplink transmission for data, control and channel sounding, can be derived from a mapping rule on the fly. DL 600 has multiple subframes with 1 ms, including SF-N, SF-N+1 SF-N+2, SF-N+3, SF-N+4, and SF-N+8. Each subframes are configured with different types of TTI resources, including sTTIs of different types and normal TTIs. The uplink resources UL 610 can be mapped to the configured DL resource 600 based on different rules. DL resource 601, which is a short TTI with ¼ of the normal TT, in SF-N is mapped to UL resource 611, which is also mapped DL resource 602 in SF-N+2. Similarly, DL resource 603, which is a short TTI with half of the normal TT, in SF-N is mapped to UL resource 612, which is also mapped DL resource 604 in SF-N+4. DL resource 605, which is a normal TT, in SF-N is mapped to UL resource 613, which is also mapped DL resource 606 in SF-N+8.

In one novel aspect, for systems configured with short TTIs, the uplink power control, downlink power control, and CSI feedback transmission mode are configured and implemented for the low latency transmission.

Figure 7:
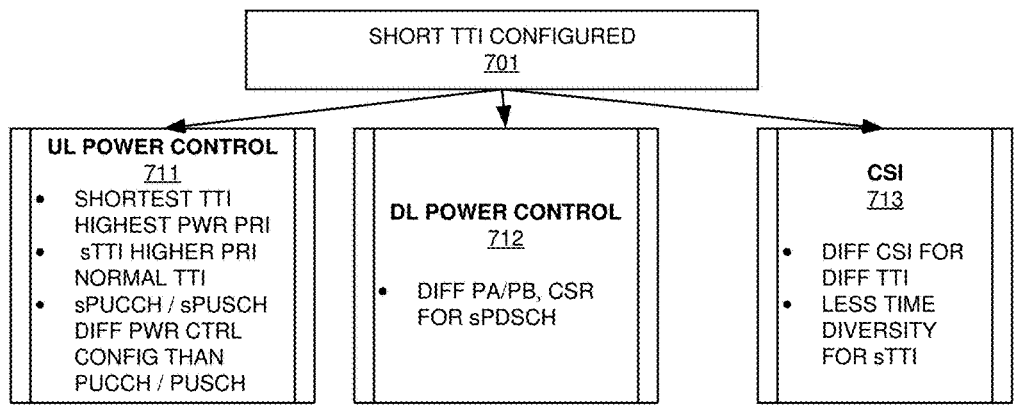
FIG. 7 shows an exemplary diagram for the uplink power control, downlink power control, and CSI-feedback transmission mode configurations in a short TTI configured system in accordance with embodiments of the current invention.

FIG. 7 shows an exemplary diagram for the uplink power control, downlink power control, and CSI-feedback transmission mode configurations in a short TTI configured system in accordance with embodiments of the current invention. At step 701, the UE determines that the short TTIs are configured. At step 711, UL power control are configured accordingly. In the case more than on data transmissions, over either the regular TTI or short TTIs are sent to one UE within a regular TTI, there can be uplink resources dynamically mapped in parallel corresponding to the downlink transmissions. And in this case, the UE needs to adjust its transmission power over each uplink resource according to the priority or UE transmit power limit. In the case that there is a shortage in uplink power and simultaneous transmissions of a short TTI and regular TTI cannot be maintained with their respectively desired power level, the transmission of the short TTI has a higher priority over a regular TTI; and if multiple levels of short TTIs and regular TTI are present, the shortest TTI has the highest priority as its transmit power is first guaranteed. In the uplink, as the operation point of sPUCCH/sPUSCH can be different from that of PUCCH/PUSCH, for sPUCCH/sPUSCH, power control is configured separately from those for PUCCH/PUSCH. At step 712, downlink power control is configured accordingly. For downlink transmission, if sPDSCH's demodulation is based on CRS, PA/PB for shortened TTIs can be also set separately from those for regular TTIs. At step 713, CSI procedures are configured accordingly. CSI feedback for different TTIs can be introduced considering a number of factors. The first factor is that the CSI feedback for short TTIs may demand short feedback latency. The second factor is that the time diversity for a transmission over a short TTI is much less than that over a longer TTI, the most suitable transmission for the short TTI can be different from that for a longer TTI. CSI feedback mode can be set for each TTI type at a UE. There are also motivations to configure different transmission modes for sPDSCH and PDSCH: first to facilitate fast processing of sPDSCH, the transmit scheme for sPDSCH can be different from that for PDSCH. In one embodiment, only rank one transmission is used for sPDSCH. second the justified overhead on a short TTI due to reference signal and control can be also different from that on a regular TTI, the suitable reference signal may be different for sPDSCH and PDSCH; third for a short TTI, not much time diversity exists and it is more important to harvest frequency diversity. From them, CSI feedback, transmission mode can be configured differently for sPDSCH and PDS.

Control Overhead Reduction

In LTE, two types of control channels are specified: PDCCH and EPDCCH. With a 20 MHz channel, PDCCH can reside on one to three OFDM symbols of a 14-OS TTI. Some REs are left unused. These REs are not occupied by CRS, PDCCH, PCFICH or PHICH. For both PDCCH and EPDCCH, a UE is not expected to detect the PDCCH and/or ePDCCH intended for another UE. The unused REs are wasted resources.

To achieve latency reduction and give network scheduling flexibility, a short TTI with self-contained control information (named, sPDCCH) is desirable in general. If the same design practice as highlighted above for LTE were followed, the overhead due to wasted resource could be severe. Methods are provided to multiplex data and control resources. Methods are also provided to manage the overhead due to control information. In the downlink control intended to a UE, the information for resources taken by co-scheduled UEs' control information is provided. In essence, a cover for the resources taken by co-scheduled UEs' control information is provided to a UE. The cover does not have to be an exact cover. In one embodiment, a superset is provided. For example, it is allowed some REs, which are not used for any UE are masked by the cover. One reason is a small number of options for the cover reduces the cover's signaling overhead.

Figure 8:
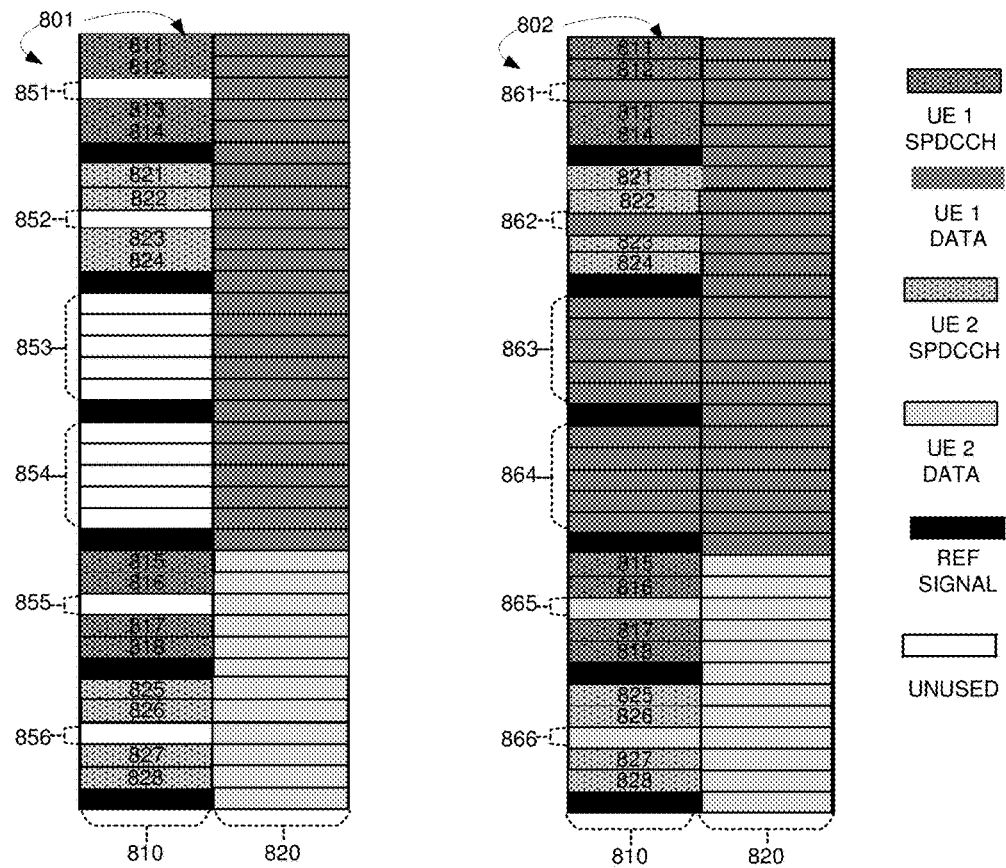
FIG. 8 shows exemplary diagrams for efficient multiplexing of control and data for control overhead reduction in accordance with embodiments of the current invention.

FIG. 8 shows exemplary diagrams for efficient multiplexing of control and data for control overhead reduction in accordance with embodiments of the current invention. System resource 801 and system resource 802 both have a control region 810 and a data region 820. For system resource 801, the REs in the first symbol of the short TTI 810 are either used by control or left un-used as in LTE (TDM). In general, neither TDM as in PDCCH/PDSCH nor FDM as in EPDCCH/PDSCH is enough to partition resources between control and data. As shown, REs 811-818 are used for sPDCCH for UE-1. REs 821-828 are used for sPDCCH for UE-2. Blocks of REs 851-856 of control symbol 810 for system resource 801 are left unused. For system resource 802, however, REs in the first symbol of the short TTI 801 are not all dedicated to control. The unused REs are also used for data. Hence the basic TDM/FDM rule can be enhanced or modified according to resource usage at that moment. As seen, some REs in 801 not used for control are used for data for UE-1, including RE blocks of 861-864. Similarly, some REs in 801 not used for control are used for data for UE-2, including RE blocks of 865 and 866.

To ensure the eNB and the UE have the same understanding of the resource partition between control and data, dedicated signaling or common signaling can be used to signal the control resources taken by others. In one embodiment, dedicated signaling is used. In another embodiment, common signaling to indicate the resources used by all sPDCCHs, from this the leftover on the first symbol can be used for data.

Figure 9:
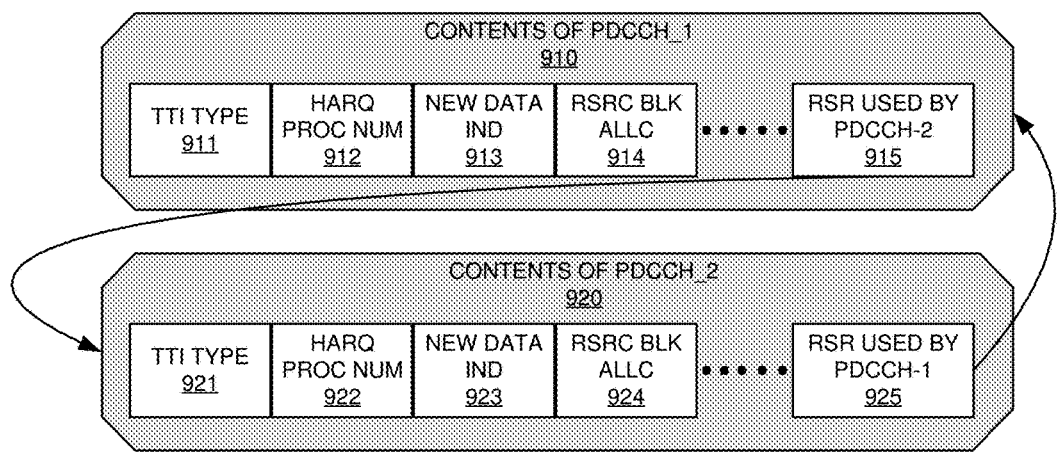
FIG. 9 illustrates an exemplary diagram for dedicated signaling to indicate control resources taken by other UEs for control overhead reduction in accordance with embodiments of the current invention.

FIG. 9 illustrates an exemplary diagram for dedicated signaling to indicate control resources taken by other UEs for control overhead reduction in accordance with embodiments of the current invention. The resources for other sPDCCHs are indicated in each sPDCCH, which also allows the leftover on the first symbol to be used for data. In one embodiment, in one short TTI, two UEs are scheduled and each one's sPDCCH provides information about resource usage of another UE. A control message for UE-1 is illustrated as PDCCH-1 910. The contents of 910 includes a TTI type 911, a HARQ process number 912, a new data indicator 913, a resource block allocation 914, and resource used by PDCCH-2 915. The resource used by PDCCH-2 915 points to the resource of PDCCH-2 920 for UE-2. PDCCH-2 920 includes a TTI type 921, a HARQ process number 922, a new data indicator 923, a resource block allocation 924, and resource used by PDCCH-1 925. The resource used by PDCCH-1 925 points to the resource of PDCCH-1 910 for UE-1.

In one embodiment, the consideration in the cover design considers providing a cover for CCEs of PDCCHs taken for other UEs in a DCI intended for one UE. A similar procedure can be performed for sPDCCH or sEPDCCH. In one embodiment, a method is provided to enumerate all the starting CCE positions for different DCIs. In a 20 MHz LTE system, there are twenty-seven positions for Aggregation level-1, level-13 positions for aggregation level-2, level-6 positions for level aggregation four, and three positions for aggregation level-8. A bitmap for the cover is used. Twenty-seven bits are needed. In another embodiment, a method is provided to indicate a cover to exclude REs for data. The cover does not have to be exact: for example, one bit is for a CCE at aggregation level-2. A bit is set to one if the corresponding CCE is fully or partially occupied. In total thirteen bits are used for the cover. It is allowed to cover a DCI with four CCEs with the cover for eight CCEs. It is allowed to cover a DCI with eight CCEs with the cover for two resources: each resource is four CCEs.

Support for Ultra-Low Latency (ULL)

When an eNB has enough processing time to schedule sTTIs and regular TTIs, the above-provided control channel design allows the eNB to create sTTIs on the fly and UEs receive the necessary signaling for sequential processing. Yet in ultra-low latency communications, it may happen that an eNB may need to interrupt an ongoing transmission, and allocate radio resources for the ultra-low latency communication, the resource allocation overrides the original resource allocation for the interrupted transmission. The design framework given above can be still used for a UE involved in the ULL communication. For example, dense candidate locations are configured for the UE so the UE can be alerted about ULL transmission with very short latency. However, if another UE, which was originally instructed to receive a transmission, which is now interrupted, can suffer catastrophically as its soft buffer contains erroneous soft bits due to resource over-riding. In one novel aspect, the eNB can alert the affected UE of the interruption by signaling after the ULL transmission.

Figure 10:
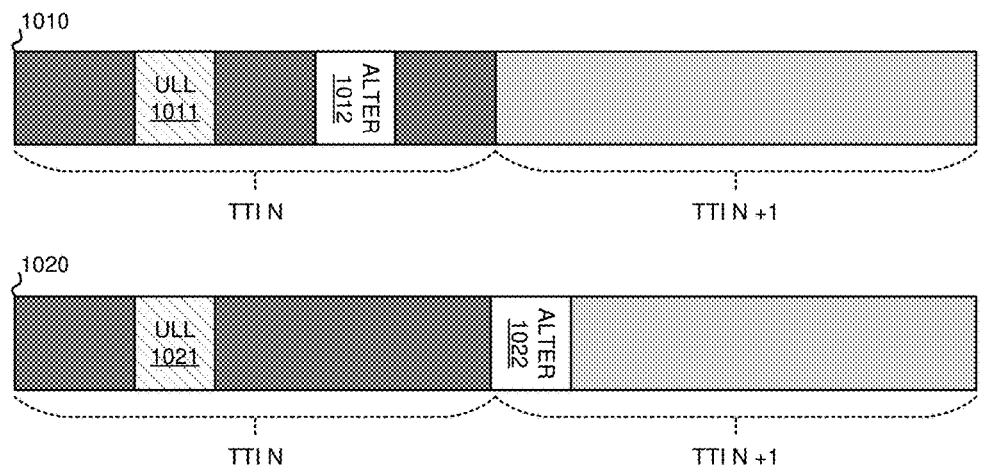
FIG. 10 illustrates exemplary diagrams for alert signals for ULL support in accordance with embodiments of the current invention.

FIG. 10 illustrates exemplary diagrams for alert signals for ULL support in accordance with embodiments of the current invention. A resource 1010 includes a TTI-N and a TTI-N+1, which follows TTI-N. In one embodiment, symbols in ULL 1011 are hijacked by other communications. An alert signal 1012 was inserted in the same TTI-N for 1010 to indicate to the UE assigned with 1010 that resources are hijacked. In another embodiment, a resource 1020 includes a TTI-N and a TTI-N+1, which follows TTI-N. Symbols in ULL 1021 are hijacked by other communications. An alert signal 1022 was inserted in the next subframe TTI-N+1 for 1020 to indicate to the UE assigned with 1020 that resources are hijacked.

Figure 11:
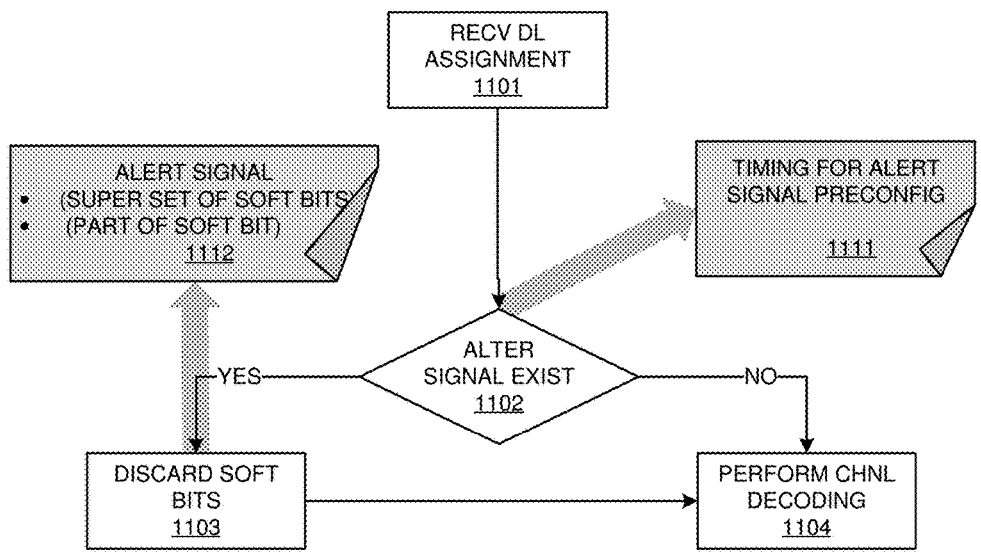
FIG. 11 illustrates exemplary flow charts for alter signal in the same TTI for ULL support in accordance with embodiments of the current invention.

FIG. 11 illustrates exemplary flow charts for alter signal in the same TTI for ULL support in accordance with embodiments of the current invention. In one embodiment, the possible alert timings are configured to a UE. Upon the arrival of the alert timing, the UE can check if some specific resource regions are over-ridden for ULL. If indeed that has happened, the UE can discard the over-ridden resource before performing soft combining operation. At step 1101, the UE receives downlink assignment for resources. At step 1102, the UE checks within the same TTI whether there exists an alert signal for ULL. In one embodiment, (method 1111), the time for the alert signal is preconfigured. If step 1102 determines yes, the UE moves to step 1103, and discards the soft bits. In one embodiment, (method 1112), a resource which covers the over-ridden resource is indicated. A superset of the over-ridden resource is indicated. In another embodiment, a resource, which covers most of the over-ridden resource while not covering all the over-ridden resource to the affected UEs is indicated. The UE then moves to step 1104 and performs channel decoding. If step 1102 determines no, the UE moves to step 1104 and performs channel decoding.

Figure 12:
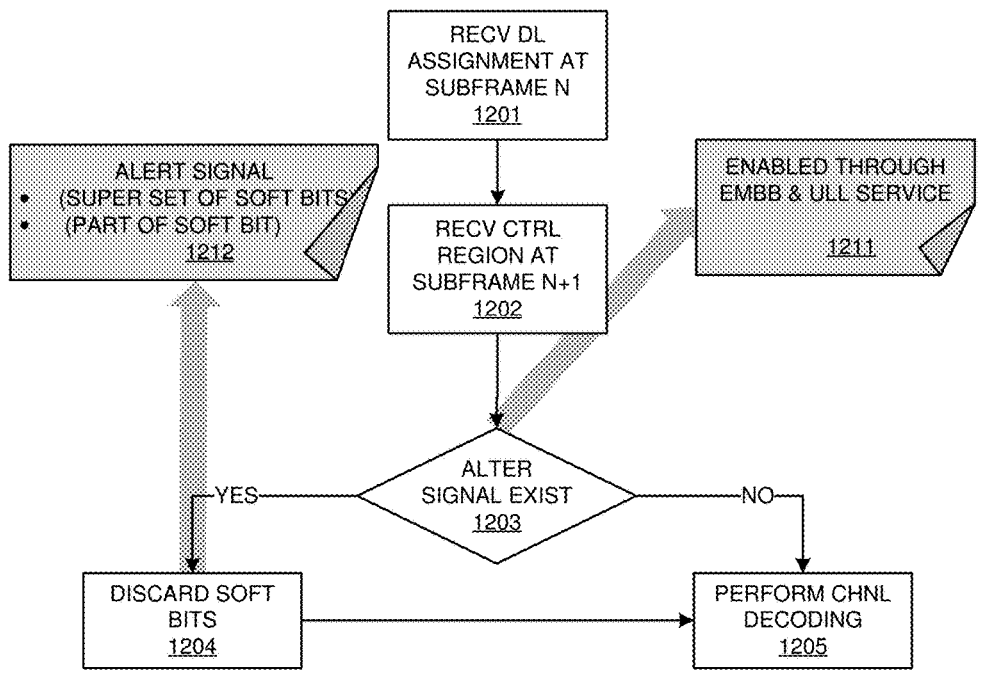
FIG. 12 illustrates exemplary flow charts for alter signal sent in the next TTI for ULL support in accordance with embodiments of the current invention.

FIG. 12 illustrates exemplary flow charts for alter signal sent in the next TTI for ULL support in accordance with embodiments of the current invention. In one embodiment, a control channel is used in the next subframe to indicate the interruption as shown in FIG. 11. In this case, in the control channel design, a unified support for enhanced mobile broadband (eMBB) eMBB and ULL can be enabled. At step 1201, the UE receives downlink assignment for resources at subframe N. At step 1202, the UE receives control region at subframe N+1. At step 1203, the UE checks in the control region at subframe N+1 whether there exists an alert signal for ULL. In one embodiment, (method 1211), the enabling of the control region is through the eMBB and ULL service enablement. If step 1203 determines yes, the UE moves to step 1204, and discards the soft bits. In one embodiment, (method 1212), a resource which covers the over-ridden resource is indicated. A superset of the over-ridden resource is indicated. In another embodiment, a resource, which covers most of the over-ridden resource while not covering all the over-ridden resource to the affected UEs is indicated. The UE then moves to step 1205 and performs channel decoding. If step 1203 determines no, the UE moves to step 1205 and performs channel decoding.

Figure 13A:
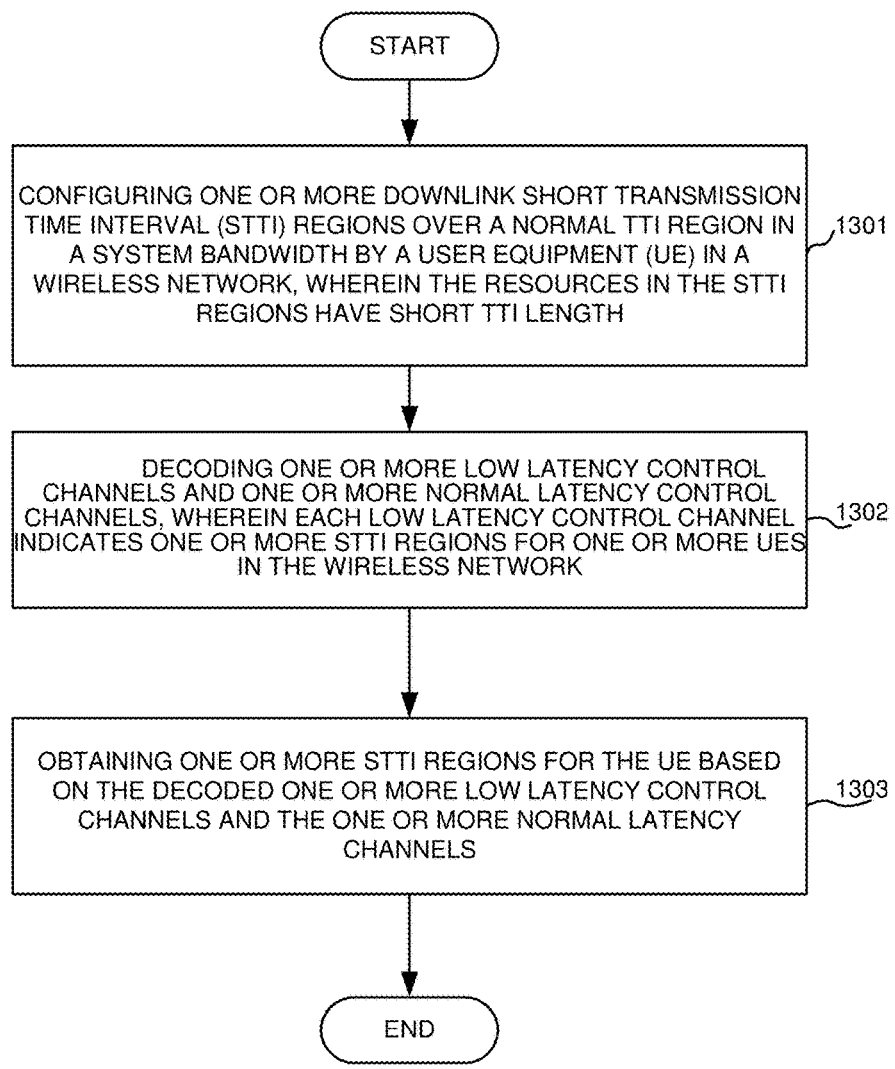
FIG. 13A illustrates an exemplary flow chart for a UE to perform a short TTI configuration for low latency communication in accordance with embodiments of the current invention.

FIG. 13A illustrates an exemplary flow chart for a UE to perform a short TTI configuration for low latency communication in accordance with embodiments of the current invention. At step 1301, the UE configures one or more downlink short transmission time interval (sTTI) regions over a normal TTI region in a system bandwidth in a wireless network, wherein the resources in the sTTI regions have short TTI length. At step 1302, the UE decodes one or more low latency control channels and one or more normal latency control channels, wherein each low latency control channel indicates one or more sTTI regions for one or more UEs in the wireless network. At step 1303, the UE obtaining one or more sTTI regions for the UE based on the decoded one or more low latency control channels and the one or more normal latency channels.

Figure 13B:
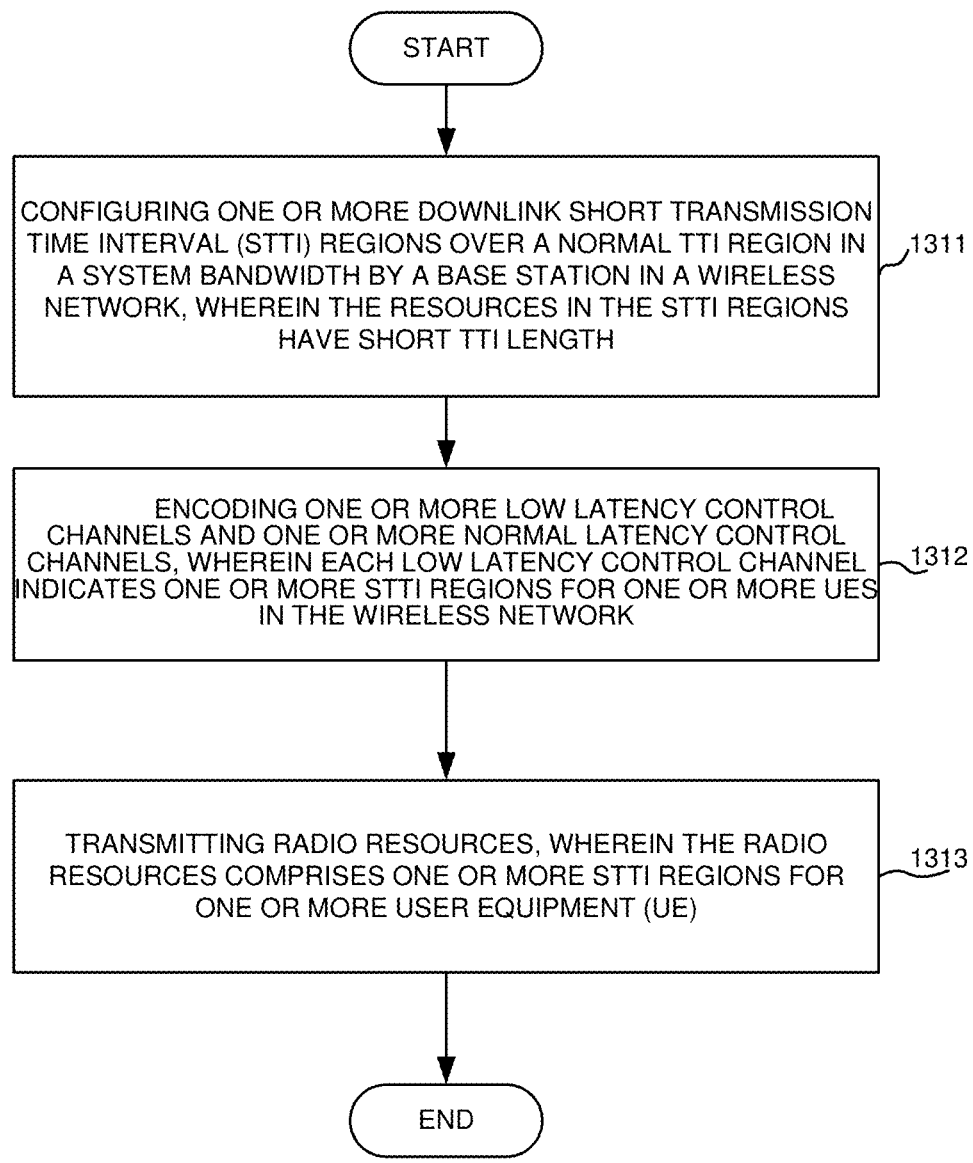
FIG. 13B illustrates an exemplary flow chart for a base station to perform a short TTI configuration for low latency communication in accordance with embodiments of the current invention.

FIG. 13B illustrates an exemplary flow chart for a base station to perform a short TTI configuration for low latency communication in accordance with embodiments of the current invention. At step 1311, the base station configuring one or more downlink short transmission time interval (sTTI) regions over a normal TTI region in a system bandwidth in a wireless network, wherein the resources in the sTTI regions have short TTI length. At step 1312, the base station encodes one or more low latency control channels and one or more normal latency control channels, wherein each low latency control channel indicates one or more sTTI regions for one or more UEs in the wireless network. At step 1313, the base station transmits radio resources, wherein the radio resources comprise one or more sTTI regions for one or more UEs.

Figure 14A:
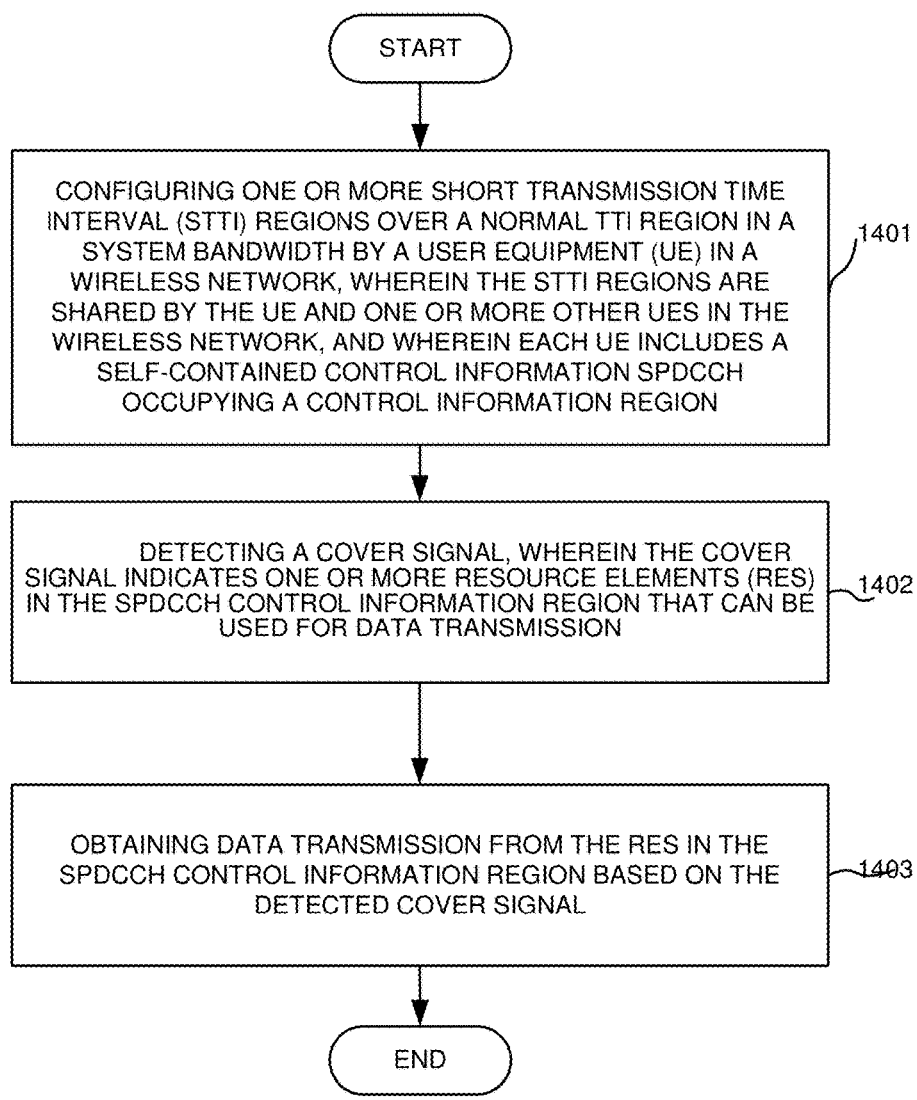
FIG. 14A illustrates an exemplary flow chart for a UE to perform control overhead reduction in accordance with embodiments of the current invention.

FIG. 14A illustrates an exemplary flow chart for a UE to perform control overhead reduction in accordance with embodiments of the current invention. At step 1401, the UE configures one or more short transmission time interval (sTTI) regions over a normal TTI region in a system bandwidth in a wireless network, wherein the sTTI regions are shared by the UE and one or more other UEs in the wireless network, and wherein each UE includes a self-contained control information sPDCCH occupying a control information region. At step 1402, the UE detects a cover signal, wherein the cover signal indicates one or more resource elements (REs) in the sPDCCH control information region that can be used for data transmission. At step 1403, the UE obtains data transmission from the REs in the SPDCCH control information region based on the detected cover signal.

Figure 14B:
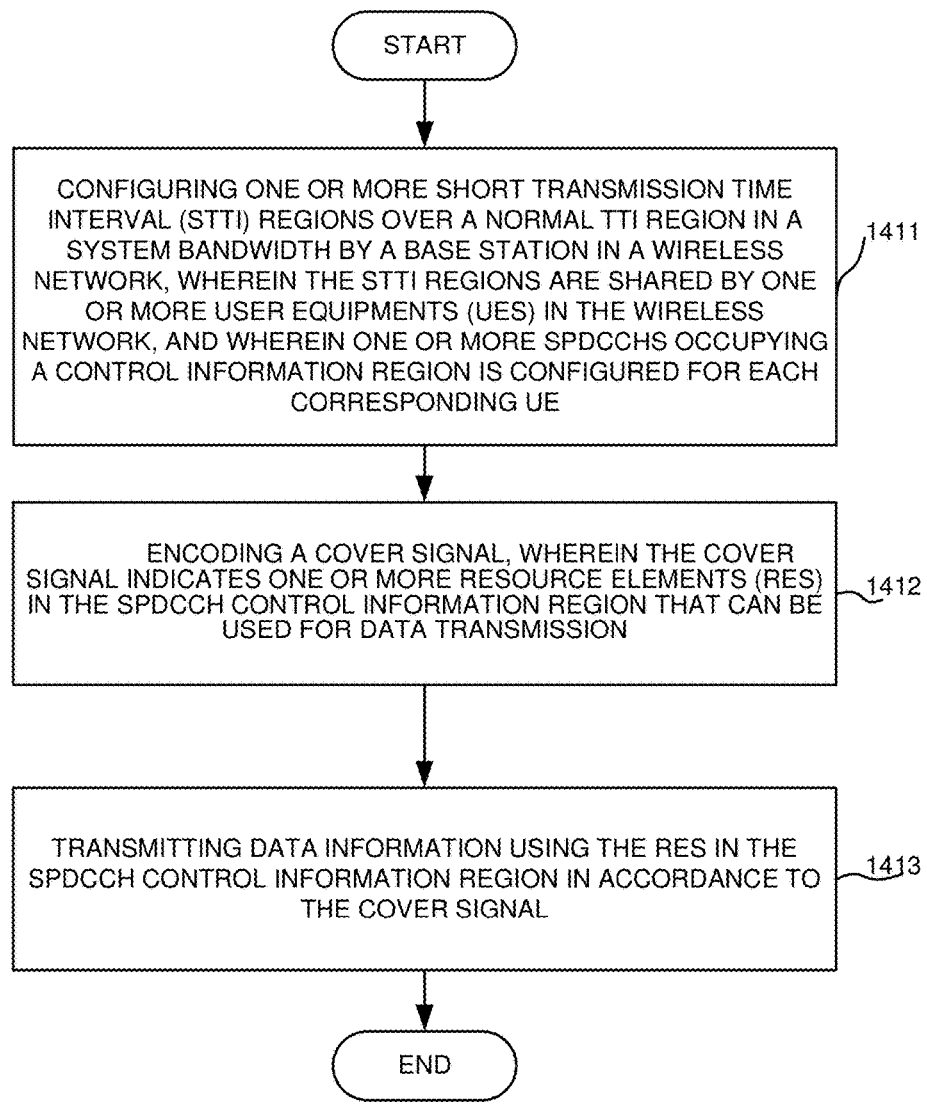
FIG. 14B illustrates an exemplary flow chart for a base station to perform control overhead reduction in accordance with embodiments of the current invention.

FIG. 14B illustrates an exemplary flow chart for a base station to perform control overhead reduction in accordance with embodiments of the current invention. At step 1411, the base station configures one or more short transmission time interval (sTTI) regions over a normal TTI region in a system bandwidth in a wireless network, wherein the sTTI regions are shared by one or more user equipments (UEs) in the wireless network, and wherein one or more sPDCCHs occupying a control information region is configured for each corresponding UE. At step 1412, the base station encodes a cover signal, wherein the cover signal indicates one or more resource elements (REs) in the sPDCCH control information region that can be used for data transmission. At step 1413, the base station transmits data information using the REs in the SPDCCH control information region in accordance to the cover signal.

Figure 15A:
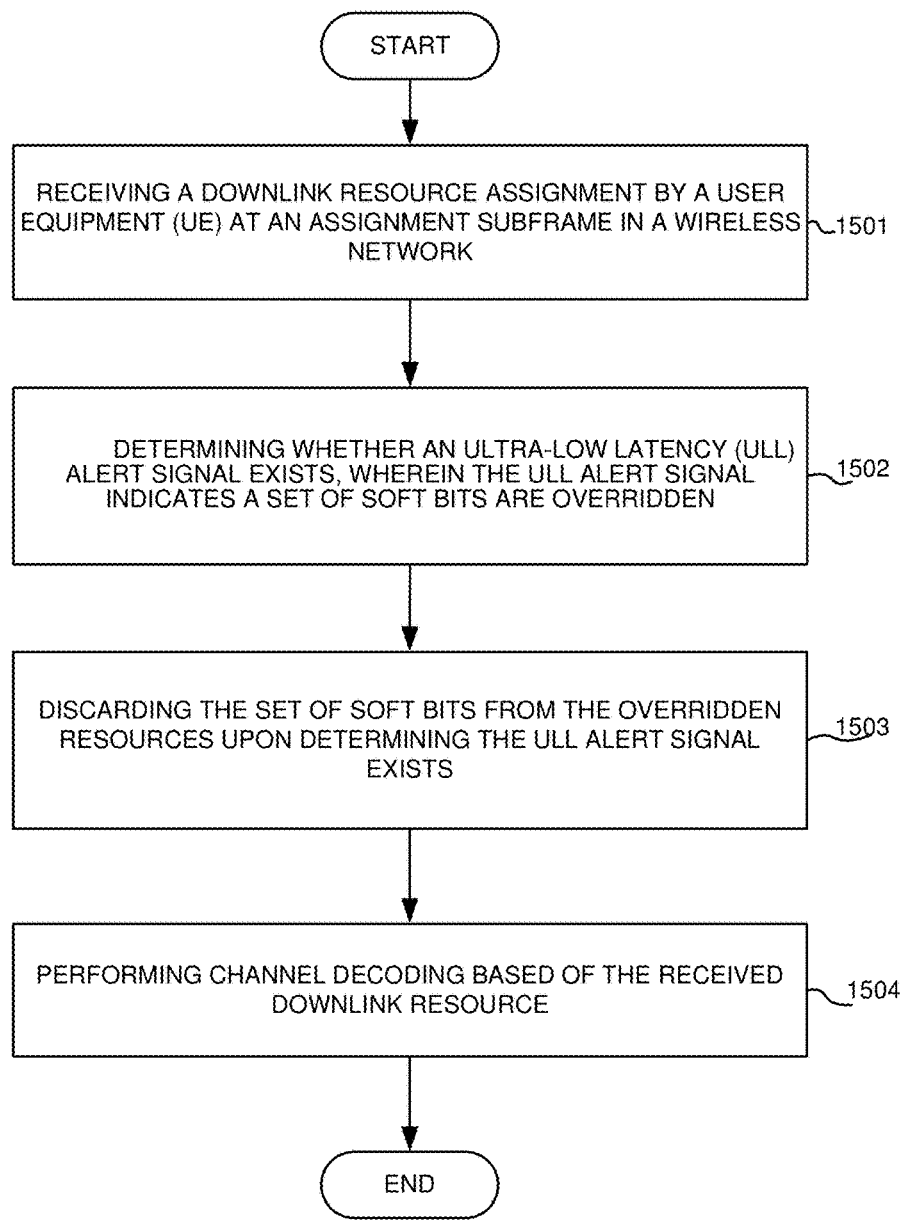
FIG. 15A illustrates an exemplary flow chart for a UE to perform ultra-low latency (ULL) procedure in accordance with embodiments of the current invention.

FIG. 15A illustrates an exemplary flow chart for a UE to perform ultra-low latency (ULL) procedure in accordance with embodiments of the current invention. At step 1501, the UE receives a downlink resource assignment at an assignment subframe in a wireless network. At step 1502, the UE determines whether an ultra-low latency (ULL) alert signal exists, wherein the ULL alert signal indicates a set of soft bits are overridden. At step 1503, the UE discards the set of soft bits from the overridden resources upon determining the ULL alert signal exists. At step 1504, the UE performs channel decoding based of the received downlink resource.

Figure 15B:
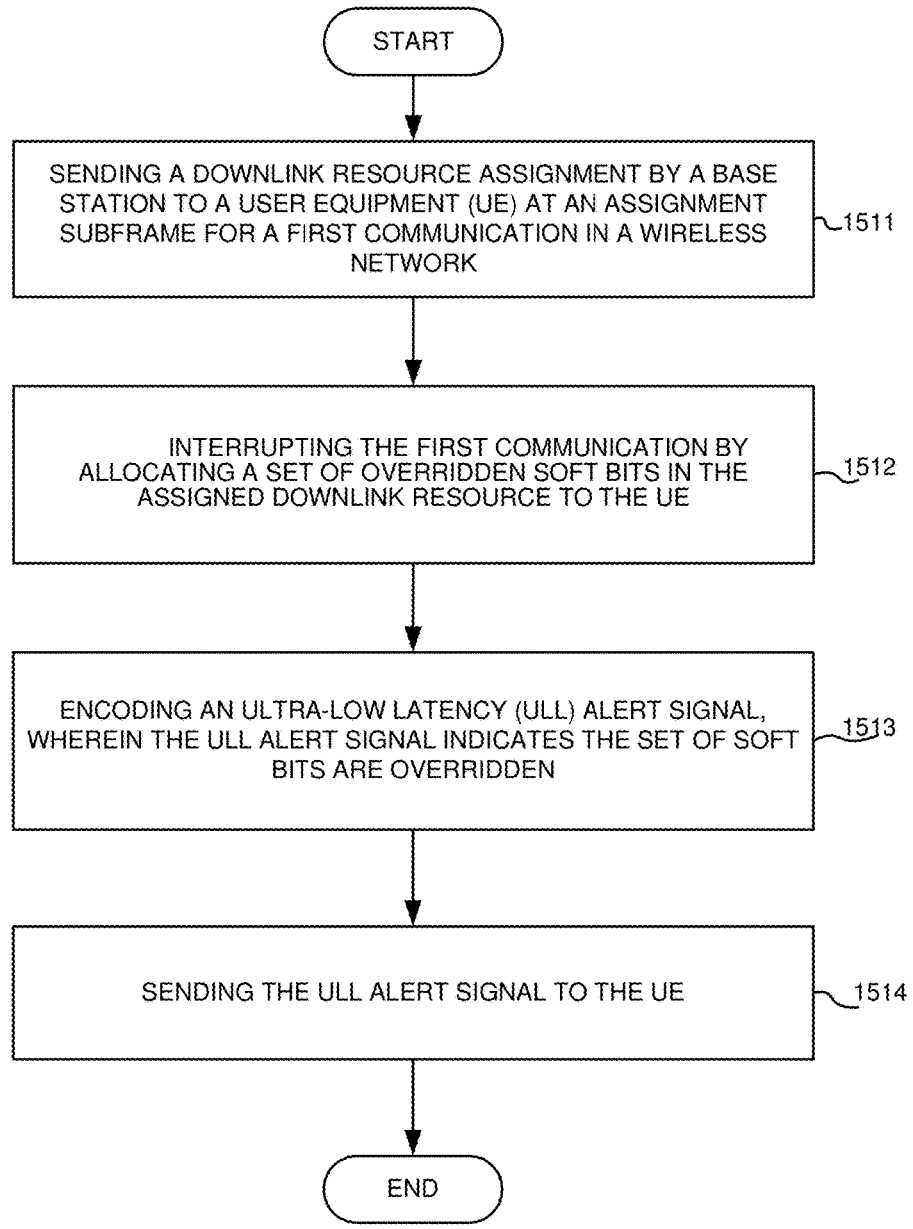
FIG. 15B illustrates an exemplary flow chart for a base station to perform ultra-low latency (ULL) procedure in accordance with embodiments of the current invention.

FIG. 15B illustrates an exemplary flow chart for a base station to perform ultra-low latency (ULL) procedure in accordance with embodiments of the current invention. At step 1511, the base station sends a downlink resource assignment to a user equipment (UE) at an assignment subframe for a first communication in a wireless network. At step 1512, the base station interrupts the first communication by allocating a set of overridden soft bits in the assigned downlink resource to the UE. At step 1513, the base station encodes an ultra-low latency (ULL) alert signal, wherein the ULL alert signal indicates the set of soft bits are overridden. At step 1514, the base station sends the ULL alert signal to the UE.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   receiving a downlink resource assignment by a user equipment (UE) at an assignment subframe in a wireless network;
   determining whether an ultra-low latency (ULL) alert signal exists, wherein the ULL alert signal indicates an overridden resource, wherein the ULL alert signal resides in a subframe selecting from a location group comprising the assignment subframe and a subframe that is right after the assignment subframe, and wherein the overridden resource is in the assignment subframe;
   discarding the overridden resource upon determining the ULL alert signal exists; and
   performing channel decoding based of the received downlink resource.

2. The method of claim 1, wherein the ULL alert signal resides in the assignment subframe, and wherein an alert timing for the ULL alert signal is preconfigured.

3. The method of claim 1, wherein the ULL alert signal resides in a subframe that is right after the assignment subframe, and wherein the ULL alert signal is enabled through an enabling of an enhanced mobile broadband (eMBB) and ULL service.

4. The method of claim 1, wherein the ULL alert signal indicates a superset of the overridden resource.

5. The method of claim 1, wherein the ULL alert r signal indicates part of the overridden resource.

6. A method comprising:
   sending a downlink resource assignment by a base station to a user equipment (UE) at an assignment subframe for a first communication in a wireless network;
   interrupting the first communication by allocating an overridden resource in the assigned downlink resource to the UE;
   encoding an ultra-low latency (ULL) alert signal, wherein the ULL alert signal indicates the overridden resource, wherein the ULL alert signal resides in a subframe selecting from a location group comprising the assignment subframe and a subframe that is right after the assignment subframe, and wherein the overridden resource is in the assignment subframe; and
   sending the ULL alert signal to the UE.

7. The method of claim 6, wherein the ULL alert signal resides in the assignment subframe, and wherein an alert timing for the ULL alert signal is preconfigured.

8. The method of claim 6, wherein the ULL alert signal resides in a subframe that is right after the assignment subframe, and wherein the ULL alert signal is enabled through an enabling of an enhanced mobile broadband (eMBB) and ULL service.

9. The method of claim 6, wherein the ULL alert signal indicates a superset of the overridden resource.

10. The method of claim 6, wherein the ULL alert signal indicates part of the overridden resource.

11. A user equipment (UE), comprising:
    a radio frequency (RF) transceiver that transmits and receives radio signals in a wireless network;
    a resource allocator that receives a downlink resource assignment at an assignment subframe in the wireless network;
    an alert detector that determines whether an ultra-low latency (ULL) alert signal exists, wherein the ULL alert signal indicates an overridden resource, wherein the ULL alert signal resides in a subframe that is right after the assignment subframe, and wherein the overridden resource is in the assignment subframe;
    a resource locator that discards the overridden resource upon determining the ULL alert signal exists; and
    a channel decoder that performs channel decoding based of the received downlink resource.

12. The UE of claim 11, wherein the ULL alert signal resides in the assignment subframe, and wherein an alert timing for the ULL alert signal is preconfigured.

13. The UE of claim 11, wherein the ULL alert signal resides in a subframe that is right after the assignment subframe, and wherein the ULL alert signal is enabled through an enabling of an enhanced mobile broadband (eMBB) and ULL service.

14. The UE of claim 11, wherein the ULL alert signal indicates a superset of the overridden resource.

15. The UE of claim 11, wherein the ULL alert signal indicates part of the overridden resource.

* * * * *